Patented Feb. 5, 1952

2,584,177

UNITED STATES PATENT OFFICE 2,584,177

MODIFIED AMINOPLASTS AND PRODUCTS PREPARED THEREFROM

Henry P. Wohnsiedler, Darien, Edward L. Kropa, Old Greenwich, and Walter M. Thomas, Stamford, Conn., assignors to American Cyanamid Company, New York, N. Y., a corporation of Maine No Drawing. Application April 19, 1948,
Serial No. 21,856

20 Claims. (Cl. 154—110)

This invention relates to new and useful compositions having properties that render them particularly useful in the plastics, coating, laminating and other arts, to products prepared therefrom and to methods of producing such compositions and products. More particularly the invention is concerned with compositions of matter and products comprising a modified aminoplast, specifically a modified, heat-curable (thermosetting) or a heat-cured (thermoset), resinous or other product of reaction of ingredients comprising (a) an aldehyde, e. g., formaldehyde, etc., and (b) a monomeric amidogen compound containing not less than two amidogen groupings each having at least one hydrogen atom attached to the amidogen nitrogen atom, e. g., urea, thiourea, melamine, methylurea, diethylmelamine, etc. In accordance with the present invention such reaction products are modified with a nitrogenous compound which is different from the compound of (b) and which is a member of the class consisting of (1) linear polymeric reaction products of (A) epsilon-caprolactam and (B) a compound represented by the general formula I

where R represents a member of the class consisting of hydrogen, alkyl radicals and monohydroxyalkyl radicals, the ingredients of (A) and (B) being employed in the ratio of 1 mole (about 1 mole) of the former to not less than 1 mole (not less than about 1 mole) of the latter, (2) aldehyde-reaction (e. g., formaldehyde-reaction) products of (1), and mixtures of (1) and (2). The scope of the invention also includes methods of preparing such compositions and products, e. g., a post-formable laminated article comprising super-imposed sheets of fibrous material impregnated and bonded together with a modified aminoplast of the kind briefly described above.

The linear polymeric reaction products referred to under (1) of the preceding paragraph are more fully described and are specifically claimed in the copending application of Edward L. Kropa and John J. Padbury, Serial No. 21,854, filed concurrently herewith, now Patent No. 2,526,078, issued October 17, 1950. As is stated in the specification of that application, the ingredients used in the preparation of such linear polymers may be employed in the ratio of 1 mole of epsilon-caprolactam to from 1 mole to 20 moles (about 1 mole to about 20 moles) of a compound or mixture of compounds of the kind embraced by Formula I, e. g., ammonia (anhydrous ammonia), an alkylamine (monoalkylamine) such, for instance, as n-butylamine, n-decylamine, etc., a dialkylamine, for example, dihexylamine, dioctylamine, etc., an alkanolamine (monoalkanolamine) such, for instance, as ethanolamine, isopropanolamine, etc., a dialkanolamine, for example, diethanolamine, di-n-butanolamine, etc. Among the linear polymeric reaction products obtained in practicing the invention covered by the aforementioned Kropa and Padbury application, and which may be used in carrying the present invention into effect, are those which are composed substantially completely of the said linear reaction products and which have an average molecular weight of not more than 2000, more particularly those having an average number of caprolactam units per molecule ranging from a little above 2 (e. g., 2.5), generally at least 3 or 4 (at least about 3 or 4), to 16 (about 16.)

The radicals represented by R in Formula I may be any alkyl radical or any monohydroxyalkyl radical, and they may be the same or different. Illustrative examples of alkyl radicals which R in this formula may represent are: methyl, ethyl, propyl, isopropyl, n-butyl, isobutyl, sec.-butyl, tert.-butyl, amyl, hexyl, heptyl, octyl, nonyl, decyl to octadecyl, inclusive, including cycloalkyl (e. g., cyclohexyl). Illustrative examples of monohydroxyalkyl radicals which R in Formula I may represent are: monohydroxymethyl, -ethyl, -propyl, -isopropyl, -n-butyl, -isobutyl, -sec.-butyl, tert.-butyl, -amyl, -hexyl, -heptyl, -octyl, -nonyl, -decyl to -octadecyl, inclusive, including monohydroxycycloalkyl (e. g., monohydroxycyclohexyl, etc.).

As is well known, aminoplasts are synthetic resins derived from amino (including imino) or amido (including imido) compounds, a typical example being urea-formaldehyde resin [reference: Modern Plastics, 17, 2, 433 (1939)]. The present invention is concerned particularly with the modification of aminoplasts which are products of reaction of ingredients comprising an aldehyde, e. g., formaldehyde, and a monomeric amidogen compound containing not less than two (e. g., two, three, four or any number, but preferably only two or three) amidogen groupings each having at least one hydrogen atom (preferably two hydrogen atoms) attached to the amidogen nitrogen atom. "Amidogen compound," as used herein and in the appended claims, has reference to an amino or an amido compound, and more particularly to such a compound (unless stated otherwise) which contains not less than two amidogen (amino or amido) groupings each having at least one hydrogen atom attached to the amidogen nitrogen atom. Urea and melamine are typical examples of amidogen compounds.

In the commercial utilization of aminoplasts in the plastics, coating and laminating arts, it is frequently necessary to modify the heat-curable (heat-convertible) or potentially heat-curable aminoplast by incorporating therein a plasticizer or softener so that the aminoplast will flow properly in the particular coating or laminating composition or, in the case of thermosetting aminoplast molding compositions, will show good plastic flow characteristics during molding. For example, if improper or insufficient plastic flow occurs during the molding operation, the molded articles may show streaked or wavy surfaces. Furthermore, if the plasticity of the molding composition is not sufficient, lack of physical homogeneity as the result of incompletely knitted granules often characterizes the moldings, especially massive moldings.

In filled (e. g., cellulose-filled) molding compositions it is also important that the plasticizer be compatible with both the cellulose and the aminoplast, e. g., a melamine-formaldehyde resin, so as to obtain molded articles having optimum dimensional stability and resistance to cracking around inserts. In impregnating, coating and laminating compositions wherein the aminoplast is utilized in the form of a solution thereof, it is also important that the plasticizer or softener for the aminoplast be soluble in the same solvent in which the aminoplast is dissolved, and for economic reasons it is also desirable that this solvent be relatively inexpensive.

There has also long been a need in the laminating art for a light-colored laminate wherein the binder for the laminae was such as to impart post-formability characteristics to the laminated sheet article. For example, whereas many plasticized melamine - formaldehyde resinous compositions are suitable for a wide variety of service applications, to the best of our knowledge and belief none of the compositions of this kind, which were known or suggested prior to our invention, have been such that a laminated article in which such prior binders were used could be satisfactorily post-formed to a desired shape, e. g., into the form of a helmet liner.

In the production of, for example, laminated structures, e. g., paper- and canvas-filled laminates, it is also important that the aminoplast binder impart optimum flexural-strength characteristics to the laminate, and that it be possible to subject the laminated article to sawing, punching, drilling and other fabrication operations without cracking, chipping, breaking or other damage thereto. These properties and, in some cases, workability are also desirable in molded aminoplast articles wherein the filler is of the finely divided type, e. g., alpha-cellulose. It is apparent, thereto, that in many cases it is desirable that the modifier of the aminoplast be able to toughen the cured aminoplast so that it will be able effectively to withstand sudden shocks and strains. In numerous instances such a toughening agent advantageously is one which also imparts a plasticizing or softening action to the heat-curable aminoplast as it assumes its ultimate form or shape. Generally, plasticizers and toughening agents perform several functions in a molding composition. The lower-molecular-weight derivatives generally promote flow and increase the plasticity of the product whereas the higher-molecular-weight components act as toughening agents.

From the foregoing it will be seen that in the utilization of plasticized aminoplasts (e. g., plasticized resinous reaction products of formaldehyde or other aldehyde with urea, thiourea, iminourea (guanidine), dicyandiamide, guanylurea, biguanide, melamine, guanylmelamine, mixtures thereof in any proportions, etc.), in molding, impregnating, coating, laminating, casting and other applications, it is important that the plasticizer or softener and/or toughening agent have certain characteristics. The particular characteristics or combination of characteristics desired in the plasticizer obviously will vary to some extent depending upon the particular service application of the plasticized aminoplast, but the following are usually necessary requisites:

The plasticizer should improve the flow of the heat-curable aminoplast, or molding or other composition containing the same, during molding or other use preferably without retarding the curing of the resin at the curing temperature. It should be compatible with the aminoplast both at normal and at elevated temperatures and should not "bleed" from the cured aminoplast or product or article comprising the same. It should not discolor, or impart an odor to, or lessen the water resistance, electrical properties, mechanical strength and other useful properties of the cured aminoplast or composition or body containing the same. The most desirable modifier, of course, is one which improves the physical properties of the cured aminoplast, as by toughening it, or makes the modified aminoplast suitable for fields of utility for which the unmodified aminoplast is unsuited.

From the foregoing it will be seen that the number of plasticizers (softeners) and/or toughening agents for heat-curable and heat-cured aminoplasts of the kind described in the first paragraph of this specification and elsewhere herein are relatively few. Urea and various substituted ureas, aniline and toluene sulfonamides are among those which heretofore have been used or suggested for use as plasticizers for aminoplasts. Various other nitrogen-containing compounds also have been suggested as plasticizers for heat-curable and heat-cured aminoplasts. In general, these prior plasticizers either have not been entirely satisfactory, so that the plasticized compositions had only limited utility, or have been so relatively expensive as to prohibit their use. Furthermore, in many cases the improvement in plasticity or softening was attained only at the sacrifice of some other useful property of the aminoplast.

The present invention is based on our discovery that linear polymeric reaction products of the kind described briefly above and more fully in the aforementioned Kropa and Padbury application Serial No. 21,854 constitute a class of materials that are particularly adapted for use as modifiers, specifically as plasticizers and/or toughening agents, of aminoplasts obtained by reaction of ingredients comprising an aldehyde, e. g., formaldehyde, and a monomeric amidogen compound containing not less than two amidogen groupings each having at least one hydrogen atom (preferably two hydrogen atoms) attached to the amidogen nitrogen atom. Such linear polymers, especially those having an average molecular weight of not more than 1200 (about 1200), more particularly those with an average molecular weight within the range of 400 (about 400) or 450 (about 450) to 1000 (about 1000), effectively plasticize the heat-convertible amidogenaldehyde aminoplast so that it has good flow characteristics during molding and in other uses. Furthermore, the curing of the heat-curable aminoplast during molding proceeds satisfactorily. Also, the aminoplast is plasticized without any substantial decrease in the other valuable properties of the heat-hardened aminoplast, such as resistance to cracking around inserts, dielectric strength, surface appearance, color, odor and mechanical strength. In fact, a definite improvement in some properties is obtained, for instance less after-shrinkage of the molded article; less cracking or tendency to crack around metal inserts in molded articles; and improved flexural strength. Furthermore, the linear polymers are soluble in cheap solvents, e. g., a mixture of water and alcohol, so that liquid compositions comprising a solution of a plasticized aminoplast can be prepared. These liquid compositions of our invention are especially suitable for use in making post-formable laminated articles comprising a cured, plasticized aminoplast binder, for which latter there has long been a need in the laminating art.

It was quite surprising and unexpected that linear polymeric materials of the kind described above would be able to coact with amidogenaldehyde aminoplasts, such as are employed in practicing our invention, with the result that the modified aminoplasts are different in kind (as evidenced by their difference in properties) from the linear polymeric material and the amidogenaldehyde aminoplast which are combined to produce the new compositions and products of the present invention. It may here be noted that all of the linear polymers used in practicing our invention are aldehyde-reactable and can be intercondensed into the amidogen-aldehyde aminoplast; or, aldehyde-reaction products of the linear polymers can be co-condensed with the amidogen-aldehyde aminoplast; or, the linear polymer and/or an aldehyde-reaction product thereof otherwise (e. g., during a milling, blending or other operation) can be caused to become chemically bound in the aminoplast and compatible with it. Since the linear polymer is bound in the aminoplast and integral with it, there is no tendency of the polymer to separate from the aminoplast or for it to cause poor "knitting" of the resin component in, for instance, a filled aminoplast. Furthermore, larger amounts of linear polymer can be tolerated as a modifier of the aminoplast than usually has been possible with plasticized aminoplasts wherein the plasticizer is non-reactive or substantially non-reactive with the aminoplast. These results were quite surprising and unexpected, since in no way could it have been predicted from the properties of the aforementioned linear polymers or from the properties of amidogen-aldehyde aminoplasts that the linear polymers not only would be able effectively to plasticize the heat-curable aminoplast but would do this without sacrifice of the useful properties of the cured aminoplast.

For a more complete description of the linear polymeric materials used in practicing the present invention, and how they are prepared, reference is made to the aforementioned Kropa and Padbury copending application Serial No. 21,854.

As therein pointed out, the reaction products of epsilon-caprolactam and a compound of the kind embraced by Formula I, using molar ratios of reactants such as have been mentioned hereinbefore, are polymeric materials having non-fiber-forming characteristics. More particularly they comprise a mixture of linear polymers having an average molecular weight not higher than 2000 (about 2000), usually an average molecular weight within the range of 300 (about 300) or 350 (about 350) to 1000 (about 1000) or 1400 (about 1400). They are normally solids which liquefy under heat. Depending upon the particular compound which is reacted with the epsilon-caprolactam and the extent, if any, to which the product has been purified, they vary from waxy or wax-like solids to fine powders or easily friable solids. Some of the products are soluble in hot water, in alcohol (ethyl alcohol), and in mixtures of alcohol and water, but are insoluble in benzene. In general, their intrinsic viscosities are relatively low, usually being within the range of 0.05 to 0.3 or 0.35. Products having intrinsic viscosities within the range of, for example, 0.05–0.1 to 0.2–0.25 may be used in plasticizing amidogenaldehyde aminoplasts as herein described.

As further pointed out in the aforementioned Kropa and Padbury application Serial No. 21,854, the polymeric reaction products of that invention, as ordinarily produced, may be represented by the following general formula:

II

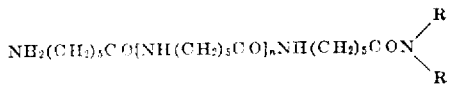

wherein $n$ represents a number from 1 to 16, inclusive, that is to say, $n$ has an average value between 1 and 16, inclusive, and R has the same meaning as given above with reference to Formula I. In all cases the initial reaction product comprises a mixture of polymers. The mixture may contain a small amount of the dimer in which case $n$ in the above formula would be 0. The crude reaction product containing a mixture of linear polymers may be fractionated by the use of particular solvents or mixtures of solvents to obtain fractions in which the polymers are present within a narrow limit of molecular weights.

Of the linear polymeric materials represented by Formula II we prefer to use, in carrying the present invention into effect, those wherein $n$ has an average value between 1 and 7, optimum results usually being obtained in most applications when the average value of $n$ is between 2 and 3. Such polymers, especially those of lower molecular weight, are readily soluble in, for example, alcohol or in mixtures of water and alcohol.

As will be apparent to those skilled in the art, the linear polymers represented by Formula II also may be represented by the general formula

III

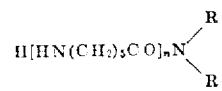

wherein $n$ has an average value between 3 and 18, inclusive, preferably between 3 and 9, inclusive, and R has the same meaning as given above with reference to Formula I. The dimer is represented when $n$ is 2.

When epsilon-caprolactam and an alkanolamine, e. g., monoethanolamine, are caused to react as described in the aforementioned Kropa and Padbury copending application, there is a possibility that the linear polymeric reaction products may be polymers corresponding to one or another of the following formulas, taking monoethanolamine as illustrative of the alkanolamine reactant employed:

IV    H[HN(CH₂)₅CO]ₙNHC₂H₄OH
V     H[HN(CH₂)₅CO]ₙNHC₂H₄OCO(CH₂)₅NH₂
VI    H[HN(CH₂)₅CO]ₙOC₂H₄NH₂ wherein $n$ has the same meaning as given above with reference to Formula III. However, since both unreacted ethanolamine and unreacted epsilon-caprolactam are present in the reaction mass at the end of the reaction period, this constitutes rather persuasive evidence that the polymeric reaction product is predominantly, if not solely or substantially completely, a polymer of the kind represented by Formula IV.

Illustrative examples of amidogen-aldehyde aminoplasts which may be modified with the linear polymeric material herein described are aminotriazine-aldehyde resins (e. g., melamine-formaldehyde resins), urea-aldehyde resins (e. g., urea-formaldehyde resins), thiourea-aldehyde resins (e. g., thiourea-formaldehyde resins), urea-aminotriazine-aldehyde resins (e. g., urea-melamine-formaldehyde resins), aminodiazine-aldehyde resins (e. g., aminodiazine-formaldehyde resins), protein-aldehyde resins (e. g., casein-formaldehyde resins), resinous condensation products of an aldehyde, e. g., formaldehyde, with a polyamide of a polycarboxylic acid, e. g., malonic diamide, succinic diamide, fumaric diamide, itaconic diamide, phthalic diamide, citric triamide, etc.

The amount of linear polymeric material of the kind used in practicing our invention and which is incorporated into the amidogen-aldehyde aminoplast to modify, specifically plasticize or soften and/or toughen, the latter may be varied as desired or as conditions may require. In some cases, only a relatively small amount may be required, e. g., from 1% to 3 or 4% by weight of the combined amount of modifier and aminoplast. Ordinarily, however, the linear polymeric modifier constitutes, by weight, from 5% (about 5%) to 50% (about 50%), more particularly from 5–10% to 30–40%, of the combined amount of modifier and aminoplast. For some applications, for example where the thermoplastic or semi-thermoplastic properties of the composition are not objectionable, the use of higher amounts of linear polymeric material in the composition is not precluded, e. g., amounts such that the linear polymer constitutes 70 or 80%, or even as much as 90%, by weight of the combined polymer and aminoplast.

Any suitable means may be employed for incorporating the linear polymer into the amidogen-aldehyde aminoplast. For example, a modified aminoplast may be prepared by first mixing together the amidogen compound, linear polymer and aldehyde and effecting simultaneous condensation between the mixed reactants in the presence or absence of addition agents, for instance condensation catalysts, fillers, other natural or synthetic resinous materials, solvents, diluents, etc. Alternatively, we may add the linear polymer to a partial reaction product of an amidogen compound and an aldehyde, and effect further reaction between the components. Or, we may first partially react the linear polymer with an aldehyde, add the resulting partial reaction product to a partial reaction product of an amidogen compound and an aldehyde, and then co-react the mixed partial reaction products. Or, we may react the linear polymer with an excess of an aldehyde, add an amidogen compound to the resulting reaction mass and effect further reaction between the components. Still other ways may be employed in producing a modified amidogen-aldehyde aminoplast in which the linear polymer is chemically bound in the resin molecule. These reactions may be effected under alkaline, neutral or acid conditions and under a variety of time, temperature and pressure conditions. The temperature of the aforementioned reactions may vary from room temperature, in certain cases, to the reflux temperature of the reactants at reduced, atmospheric or superatmospheric pressure. The reactants may be dissolved or dispersed in a suitable liquid medium, if desired, during the reaction.

Any suitable aldehyde may be employed as a reactant with the amidogen compound or with the linear polymer in producing an aldehyde-reaction product thereof. We prefer to use formaldehyde, e. g., aqueous solutions of formaldehyde. Paraformaldehyde, hexamethylenetetramine, or other compounds engendering formaldehyde also may be employed. In certain cases other aldehydes, e. g., acetaldehyde, propionaldehyde, butyraldehyde, acrolein, methacrolein, crotonaldehyde, octaldehyde, benzaldehyde, furfural, mixtures thereof, or mixtures of formaldehyde (or compounds engendering formaldehyde) with such other aldehyde or aldehydes, may be employed. The choice of the aldehyde is dependent upon such factors as, for instance, the particular properties desired in the finished product and economic considerations.

The linear polymer or an aldehyde-reaction product thereof, e. g., a methylol derivative of the linear polymer, or a mixture of the linear polymer and an aldehyde-reaction product thereof, may be incorporated, if desired, into the heat-curable amidogen-aldehyde aminoplast at any suitable stage of the manufacture of a molding, coating, impregnating, laminating or other composition therefrom. For example, the modifier may be dry or wet blended with the amidogen-aldehyde resin (e. g., a melamine-formaldehyde resin, etc.), a filler (e. g., alpha-cellulose, wood flour, etc.), a mold lubricant (e. g., zinc stearate, etc.), and, if desired, a curing catalyst (e. g., phthalic anhydride, tetrachlorophthalic anhydride, ammonium chloride, oxalic acid, acetic acid, phosphoric acid, diammonium phthalate, diammonium hydrogen phosphate, diammonium ethyl phosphate, ammonium silicofluoride, a melamine fluosilicate, a melamine fluoborate, melamine pyrophosphate, chloroacetamide, succinic acid, etc.). Thereafter the mixture is worked on hot rolls to cause at least some of the linear polymer or aldehyde-reaction product thereof to co-react or intercondense with the amidogen-aldehyde aminoplast. During such working, the cure of the heat-curable or potentially heat-curable composition is advanced to a desired stage. The resulting sheet is then broken and ground to produce a molding composition. If necessary, the homogeneous (substantially homogeneous) molding compound may be heated further prior to molding in order to advance the reaction still further and to stiffen the flow of the compound during molding.

Liquid compositions may be produced, for instance, merely by dissolving the amidogen-aldehyde aminoplast and the modifier in a suitable mutual solvent. For example, in the case of water-soluble, alcohol-soluble or water- and alcohol-soluble urea-formaldehyde, melamine-formaldehyde, urea-melamine-formaldehyde resins, and the like, the liquid composition may be prepared merely by admixing with such a solution a linear polymer modifier, or an aldehyde-reaction product thereof, or a mixture of the two, which also is soluble in the same solvent or mixture of solvents, or which can be made soluble therein by the addition of another solvent, e. g., acetone.

In order that those skilled in the art better may understand how the present invention may be carried into effect, the following examples are given by way of illustration and not by way of limitation. All parts and percentages are by weight unless otherwise stated.

EXAMPLE 1

The linear polymeric material used in this example was produced by reaction of 800 parts of epsilon-caprolactam and 400 parts of ammonia as described under Example 8 (Tables I and II) of the aforementioned Kropa and Padbury copending application Serial No. 21,854. This material was a crude linear polymer containing some unreacted caprolactam. It was a soft, light tan wax. It was heated to 120° C. to free it of ammonia, after which it was heated with an aldehyde, specifically formaldehyde, as follows:

| | Parts |
|---|---|
| Linear polymer | 20 |
| Aqueous formaldehyde (approx. 37% HCHO) | 10 | were heated together until the polymer dissolved, yielding a clear, amber-colored, slightly viscous solution, which was then heated for several minutes near its boiling point. The resulting solution was clear at room temperature. Upon heating a sample at 90° C. to dryness a resinous material was obtained. The solution of the reaction product of the linear polymer and formaldehyde congealed after standing for several hours at room temperature. After redispersing and cooling, the pH of the reaction mass was 9.2.

EXAMPLE 2

Same as Example 1 with the exception that about 5 parts of aqueous 0.5 N HCl was added along with the 20 parts of linear polymer and 10 parts of aqueous formaldehyde. A reaction product similar to that of the product of Example 1 was obtained. The pH of the cooled solution was 8.7.

EXAMPLE 3

One hundred and thirty-four (134) parts of the same linear polymer (which had been heated to 120° C.) as was used in Examples 1 and 2 was extracted (leached) with benzene by heating the benzene-treated polymer on a hot plate, filtering off the benzene-insoluble polymer, and washing it with benzene. The yield of the dried residue (benzene-insoluble polymer) was 85 parts. The filtrate was concentrated on a steam bath, yielding 44 parts of a liquid which crystallized when seeded with a small amount of epsilon-caprolactam. The crystalline solid was mostly unreacted epsilon-caprolactam. When the residue was triturated in water, it dispersed in the form of a fine solid which, on drying, organized itself as a gel.

A portion of the dried, benzene-insoluble polymer was used as follows:

| | Parts |
|---|---|
| Linear polymer | 20 |
| Aqueous formaldehyde (approx. 37% HCHO) | 20 | were heated together to and at the reflux temperature of the mixed reactants for a total of 10 minutes. The polymer dissolved in the aqueous formaldehyde. Upon cooling the reaction mass to room temperature a crystalline mushy product having a pH of 8.3 was obtained. A sample, which had been heated at 105° C. to yield a film, could be indented by a sharp implement but was somewhat tough and was unaffected by water.

Upon adding water to a sample of the solution of the initial reaction product while cooling, it became hydrophobic. When a concentrated sodium hydroxide solution was added to another sample it produced little change in the cold, with no liberation of ammonia, but attacked the reaction product on warming.

The main portion of the reaction mass was heated under reflux at boiling temperature for an additional 2 hours with little external change in its appearance. Samples of the aqueous reaction product were heated on a melting-point bar at different temperatures with the following results:

130° C.: A slightly cloudy melt was obtained, which congealed to a cloudy resin.
160° C.: A clear melt initially was produced. This melt formed a tough material that could be drawn hot into threads.
190°–215° C.: The hot mass could be drawn hot into threads, after which it turned brown and solidified.

EXAMPLE 4

Same as Example 3 with the exception that 30 parts of aqueous 10% formic acid was added along with the linear polymer and aqueous formaldehyde. The solution was clear after heating for 10 minutes to and at the reflux temperature of the mass. The pH of the solution on cooling was 8.1. The cold reaction mass was a crystalline mush. The addition of water to a small sample, while cooling, did not cause solution of the insoluble material. When a solution of sodium hydroxide was added to another sample, it precipitated an agglomerated mass without the liberation of any ammonia.

When the main reaction mass was heated under reflux at boiling temperature for an additional 2 hours, there was little external change.

EXAMPLE 5

The linear polymer used in this example was prepared by heating together under reflux for 45¼ hours equal molar proportions of epsilon-caprolactam and monoethanolamine. The resulting reaction mass was distilled to remove volatile material under a pressure of about 2 mm. at a temperature up to 250° C. The residual polymer constituted about 74% of the starting reactants. It was a cream-colored, soft wax which had an intrinsic viscosity of 0.17 and partly melted at 119° C. (See Example 19 of the aforementioned Kropa and Padbury copending application Serial No. 21,854 for a definition of intrinsic viscosity.) The polymer was assumed to have an average molecular weight of 513 with a total of five reactive amido and amino groups. It was used in forming an aldehyde-reaction product thereof as described below:

|  | Parts | Approx. Molar Ratio |
|---|---|---|
| Linear polymer | 200.0 | 1 |
| Aqueous formaldehyde (approx. 37% HCHO) | 158.0 | 5 |
| MgO | 0.25 |  | were heated together in a reaction vessel fitted with a sweep stirrer and reflux condenser. Heating was continued at a gradually increasing temperature up to 140° C., at atmospheric pressure and with agitation, for 3½ hours. After heating for about 2 hours under reflux the free formaldehyde in the reaction mixture, originally calculated as being 16.3%, was reduced to 6.4%. At the end of the 3½-hour heating period, the apparatus was fitted up for vacuum distillation and heating under reduced pressure was continued for another 30 minutes to concentrate the reaction product. The yield of the product amounted to 225 parts.

Other aldehyde-reaction products of the linear polymers identified under Examples 1, 3 and 5 are produced by using, instead of aqueous formaldehyde, equivalent amounts of other aldehydes, e. g., acetaldehyde, acrolein, methacrolein, furfural, butyraldehyde and others such as have been mentioned hereinbefore by way of illustration. The reaction between the aldehyde and the crude or purified linear polymer may be carried out under acid, alkaline or neutral conditions, or initially under alkaline conditions (pH above 7.0) and finally under acid conditions (pH below 7.0), and at temperatures ranging, for example, from room temperature up to the melting or boiling point of the mixed reactants or the boiling point of solutions or dispersions of the dissolved or dispersed reactants.

EXAMPLE 6

| | Parts |
|---|---|
| Malamine-formaldehyde resin [1] | 487 |
| Resin of Example 5 | 163 |
| Alpha-cellulose (60 mesh) | 350 |
| Mold lubricant, specifically zinc stearate | 10 |

[1] This resin was a dry, heat-curable material obtained by reaction of melamine and formaldehyde in the ratio of 1 mole of the former to 2 moles of the latter.

The above ingredients were blended together in a mixing unit for 1¼ hours, the lumps of the Example 5 resin (modifying resin) thereby being broken up to about ¼-inch size. The mixture was further worked on differential rolls having a clearance of 60 mils therebetween. The hot roll (fast roll) was at a temperature of 130° C. at the beginning and 126° C. at the end, while the temperature of the cold roll (slow roll) was 100° C. The modifying resin blended in readily within 1 to 2 minutes. The sheet formed on the cold roll, was transferred to the hot roll in 4 to 6 minutes, and was removed from the latter in 7½ minutes. The sheet showed good plasticity on the rolls and was removed in a single sheet. It was translucent, cream-colored, and very flexible and strong when cold. The plasticity value (flow mold, 290° F.) was 0.041. The sheet was broken and ground in an Abbé cutter through a ⅛-inch screen to form a molding compound for test purposes.

A molded article was produced by molding a sample of the molding compound for 5 minutes at 155° C. under a pressure of about 3750 pounds per square inch. The mold shrinkage was 5.6 mils and the after-shrinkage 2.9 mils as compared with a mold shrinkage of 6.4 mils and an after-shrinkage of 4.2 mils for a similar melamine-formaldehyde molding compound containing no modifying resin and which had been cured for 7½ minutes under the same temperature and pressure conditions. Other pertinent data on molded articles made from unmodified melamine-formaldehyde molding compound (A) and from the molding compound of this example (B) are shown below:

|  | Molded Article of— | |
|---|---|---|
|  | (A) | (B) |
|  | Mils | Mils |
| Mold shrinkage, 10-minute cure | 6.1 | 5.0 |
| After-shrinkage, 10-minute cure | 5.2 | 2.9 |
| Flexural modulus | 1.39 | 1.18 |

EXAMPLE 7

The formula and procedure were essentially the same as described under Example 6 with the exception that, instead of using 163 parts of the resin of Example 5, there was used about 163 parts of the linear polymer employed in making that resin and the ingredients were blended in the mixer for only 30 minutes instead of 75 minutes. The temperature of the hot roll was 125° C. at the beginning and 132° C. at the end, while the cold roll was 102° C. at the beginning and 100° C. at the end. The sheet was transferred from the cold roll to the hot roll in 3¾ minutes, and was taken off the latter in 5 minutes. The plasticity value was 0.42. Pertinent data on molded articles made from unmodified melamine-formaldehyde molding compound (A) and from the molding compound of this example (C) are shown below:

|  | Molded Article of— | |
|---|---|---|
|  | (A) | (C) |
|  | Mils | Mils |
| Mold shrinkage, 10-minute cure | 6.1 | 5.4 |
| After-shrinkage, 10-minute cure | 5.2 | 2.1 |
| Mold shrinkage, 15-minute cure | 5.7 | 5.6 |
| After-shrinkage, 15-minute cure | 7.0 | 2.5 |
| Flexural modulus | 1.39 | 1.17 |

EXAMPLE 8

The linear polymer used in this example and in Example 9 was a reaction product of epsilon-caprolactam and ethanolamine (monoethanolamine). It is the crude polymeric material described under Example 17 (next to the last paragraph of that example) of the forementioned Kropa and Padbury copending application. It is a yellow solid having a melting point (softening point) of 178°–180° C. and an intrinsic viscosity of 0.26. This polymer was used in modifying an unfilled melamine-formaldehyde resin as described below:

| | Parts |
|---|---|
| Melamine-formaldehyde resin (same as in Example 6) | 900 |
| Linear polymer | 100 |
| Zinc stearate | 10 |

The modifier (linear polymer) was reduced in size by passing it thru an Abbé mill having a ⅛-inch screen and then dry blended with the ground melamine resin and zinc stearate. The product was charged to differential rolls having the fast roll (15 R. P. M.) at 126° C. and the slow roll at 71° C., the clearance between rolls being 60 mils. After 24 minutes the charge transferred from the cold roll to the hot roll and the dispersion of the modifier then became complete. After 41½ minutes, polymerization had advanced to the point where the sheet appeared dry and was losing its plastic nature. It was then withdrawn, cooled and ground to granular size. This molding compound was somewhat stiffer in plastic flow, as evidenced by a higher flow value (0.054) than the compound of the preceding example. When this composition was molded at 155° C. under a pressure of 3750 pounds per square inch, with a curing period of 10 minutes, the product was highly translucent, indicating a high degree of compatibility of the modifier and parent or primary resin. The modulus of elasticity in flexure was 1.11 as compared with a value of 1.27 for a molded unplasticized melamine-formaldehyde resin of a similar unfilled type.

EXAMPLE 9

| | Parts |
|---|---|
| Melamine-formaldehyde resin (same as in Example 6) | 552.5 |
| Linear polymer (same as in Example 8) | 97.5 |
| Alpha-cellulose (60 mesh) | 350.0 |
| Zinc stearate | 10.0 |

The above ingredients were blended together in a mixer for 30 minutes, and the mixture then was milled on differential rolls having a clearance of 60 mils between rolls. The hot or fast roll was at a temperature of 137° C. at the beginning and 134° C. at the end, while the temperature of the cold or slow roll was 97° C. at the beginning and 96° C. at the end. The mixture "grabbed" on the rolls very well and formed cleanly on the cold roll for about 1 to 2 minutes, after which part of the mass was picked up by the hot roll. The transfer to the hot roll was complete in about 4½ minutes. The blend was particularly marked by tenacious adherence to the cold roll until it transferred to the hot roll, but despite this initial tenacity it left the cold roll cleanly. The compound showed good plasticity and sheeting, with no abnormalities, while on the hot roll. After milling for 5½ minutes on the hot roll it was removed therefrom. At this point it was freely plastic, although beginning to show some signs of stiffening. It formed a perfect sheet, which was thin, continuous, leathery and tough when cold. It was translucent, light yellow in color, and had good uniformity and body texture. The plasticity value (flow mold, 290° F.) was 0.054.

Another sheet was formed in a similar manner, the hot roll being 132° C. at the beginning and 130° C. at the end, while the cold roll was 103° C. at the beginning and 94° C. at the end. The sheet was transferred from the cold to the hot roll in about 4 to 4½ minutes, and was removed from the hot roll after a little over 5 minutes. Its plasticity value was 0.048, and its workability on the rolls and general properties were much the same as the sheet obtained as described in the previous paragraph. This sheet was broken and ground for test purposes as described under Example 6.

When a sample of the resulting molding compound was molded around a 1¾-inch metal insert, it showed no cracking around the insert after 16 cycles on an insert cracking test. In this test a steel cylinder, 1¾ inches in diameter, was molded as an insert in a plastic part having a diameter of 2 inches. In other words, a ⅛-inch thick plastic wall surrounded the insert. The part was subjected to a test in which it was heated for 15 hours at 220° F. and then cooled and exposed for 9 hours at room temperature. This cycle was repeated 16 times. In comparison with the aforementioned result a molded, unplasticized melamine-formaldehyde resin of a similar, filled type showed cracking of the plastic wall in from 1 to 9 cycles.

When other samples were molded by heating for periods of 10 and 15 minutes at a temperature and pressure such as was used in molding the compound of Example 6, the compounds showed good plastic flow during molding, and yielded hard, well-cured molded articles having an after-shrinkage only slightly higher than that of the molded articles of Example 7.

EXAMPLE 10

The linear polymer used in this example was obtained by heating 1000 parts of epsilon-caprolactam and 500 parts of ammonia under pressure in an autoclave for 24 hours at 200° C.

| | Parts |
|---|---|
| Melamine-formaldehyde resin (same as in Example 6) | 488 |
| Linear polymer | 162 |
| Alpha-cellulose (60 mesh) | 350 |
| Zinc stearate | 10 | were blended together in a mixer for 30 minutes, and the resulting blend then was milled on differential rolls as described in preceding examples. The temperature of the fast or hot roll was 125° C. both at the beginning and at the end, while that of the slow or cold roll was 90° C. at the beginning and 105° C. at the end. The sheet, which formed mostly on the cold roll at the beginning of milling, later transferred in part to the hot roll. After cutting, the transfer to the hot roll was complete in 4 to 5½ minutes. The sheet was removed from the hot roll after about 6 minutes. It came off the roll quite cleanly. It was about ¼ inch thick, cream-colored, translucent, of uniform texture and quite strong. The plasticity value was 0.042. The sheet was broken and ground for test purposes as described under Example 6.

The compound yielded hard, well-cured molded articles which showed good plastic flow during molding. Although the after-shrinkage was slightly higher than that of the molded articles of Example 9, samples of the compound which were molded around a 1¾-inch metal insert showed no cracking around the insert after 16 cycles on an insert cracking test such as that described under Example 9.

Post-formable laminates

The property of formability in a laminate increases its versatility and its potential applications widely. In the decorative laminate field, wherein laminates utilizing a melamine-formaldehyde resin as a binder for the laminae excel, there has long been need for a laminating composition which would make possible the production of post-formable laminated articles. In unmodified form melamine-resin laminates show poor post-forming properties.

The technique used in commercial practice for post-forming laminates involves a short heating period of about 1 to 2 minutes at fairly high temperatures, e. g., 150° to 200° C. or higher, followed immediately by forming in a die under a low pressure of the order of 5 to 100 pounds per square inch. For heating purposes an oven, infrared lamps or high-frequency heating means are used. Dies may be constructed of wood or metal without expensive finishing. In order properly to be considered "post-formable," laminates must be formable under these conditions. In addition, for a given thickness of laminate, a radius of curvature at least equal to the thickness of the laminate should be possible.

We have discovered that the modified amidogen-aldehyde resinous materials of this invention, and especially the modified melamine-formaldehyde resins, are particularly adapted for use in the production of post-formable laminates. In such compositions the linear polymers obtained by reaction of epsilon-caprolactam with ammonia, especially those having an average molecular weight of the order of 350 or 400 to 600 or 650, seem to be more satisfactory than those produced by reaction of epsilon-caprolactam with a primary or secondary amine or alkanolamine and of the same general order of average molecular weight. However, both classes of linear polymers readily dissolve in the usual amidogen-aldehyde laminating resin solvents (e. g., acohol, mixtures of water and alcohol, mixtures of water and ethylene glycol ethyl ether, etc.) and, when necessary, can be decolorized in solution, e. g., with a decolorizing carbon. For these applications the amount of linear polymer modifier may be varried as desired or as conditions may require, e. g., from about 20 to 60% modifier to from about 80 to 40% of melamine-formaldehyde, urea-formaldehyde or other amidogen-aldehyde resinous composition, more particularly from about 25 to 40% modifier to from about 75 to 60% of amidogenaldehyde resin, these percentages being by weight. The solvent may be varied in amount in order to produce a liquid composition of the desired viscosity and penetrating characteristics.

EXAMPLE 11

A liquid impregnating solution was prepared from the following:

| | Parts |
|---|---|
| Linear polymer [1] (polymeric reaction product of ammonia and epsilon-caprolactam) | 75 |
| Melamine-formaldehyde resin (same as Example 6) | 225 |
| Denatured ethyl alcohol | 50 |
| Water | 150 |

[1] This linear polymer was a purified material and had an average molecular weight of about 580.

Strips of 6.7 oz. canvas duck were dipped in the above solution and were then dried for 15 minutes at 115° C. The non-fibrous content of the dried strips was 54%, and a small test sample lost 3.9% of its weight on being heated for 10 minutes at 150° C. An assembly of 5 such sheets having the direction of the weave alternating was pressed for 30 minutes at 150° C. under a pressure of 1000 pounds per square inch. The resulting panel was well-formed, translucent and very slightly yellow. Strips sawed from this canvas-base laminate were heated for 1 minute in an oven at 215° C., removed and quickly bent through 90° over a ½-inch radius using a simple wooden die. The cooled piece conformed to the shape of the die and did not straighten out in the course of one year. The bent portion was strong and free from cracks. In marked contrast, a similar panel containing unmodified melamine-formaldehyde resin broke sharply at the bend.

EXAMPLE 12

The procedure of Example 11 was repeated using the following solution:

| | Parts |
|---|---|
| Linear polymer (same as in Example 11) | 150 |
| Melamine-formaldehyde resin (same as in Example 6) | 150 |
| Denatured ethyl alcohol | 60 |
| Water | 140 |

After a drying period of 15 minutes at 120° C. the non-fibrous content of the dried strips was 55%, and a small sample showed a volatile loss of 5%. Infrared lamps were substituted for the oven heating, and a section of laminate was heated 1 minute to a temperature within the laminate of 150° C. It could then be bent around radii as small as $\tfrac{1}{16}$ inch with only microscopic craze lines appearing.

EXAMPLE 13

The linear polymer employed in this example was a reaction product of ethanolamine and epsilon-caprolactam, and was the same as that used in Examples 8 and 9.

| | Parts |
|---|---|
| Linear polymer (same as in Examples 8 and 9) | 75 |
| Melamine-formaldehyde resin (same as in Example 6) | 225 |
| Ethylene glycol monoethyl ether | 123 |
| Water | 123 |

Canvas duck was impregnated with the above solution and dried as in Example 12. The non-fibrous content of the dried strips was 63%, and a small sample showed a volatile loss of 8.6%. A laminate produced as described under Example 11 was dark in color but otherwise good. After heating for from 30 to 45 seconds in an oven at 225° C., strips of the panel could be bent without fracture around a ½-inch radius through 90°.

EXAMPLE 14

This example illustrates the production of a paper-base laminate using a modified amidogen-aldehyde resin of this invention as a binder for the laminae.

Paper was impregnated with the solution of Example 11. The impregnated paper was dried for 10 minutes at 115° C. The non-fibrous content of the dried paper was 50%, and a small sample lost 3.5% of its weight when heated for 10 minutes at 150° C. An assembly comprising 15 superimposed sheets of the impregnated paper was pressed for 30 minutes at 150° C. under a pressure of 1000 pounds per square inch. Although the color was slightly yellow, the surface appearance, translucency and mechanical properties were all good. The results of tests on this panel in comparison with a panel similarly made from unmodified melamine-formaldehyde resin are shown below:

| | Panel Produced From— | |
|---|---|---|
| | Unmodified Resin | Modified Resin |
| Per cent water absorbed after immersion for 24 hours in water at 25° C. | 0.8 | 0.7 |
| Dynstat flexural strength, p. s. i. | 1,500 | 1,900 |
| Dynstat angle, degrees | 7 | 8 |
| Dynstat impact strength, ft. lbs. | 13 | 26 |
| Flexural modulus ($\times 10^6$) | 1.90 | 1.74 |

EXAMPLE 15

Same as Example 6 with the exception that 487 parts of urea-formaldehyde resin (heat-curable urea-formaldehyde resin) is used instead of 487 parts of the heat-curable melamine-formaldehyde resin of that example. A well-plasticized molding compound is obtained, which yields hard, well-cured molded articles that show good flow characteristics during molding at temperatures of the order of 150° C. under pressures of about 2000-3000 pounds per square inch.

Instead of replacing all of the melamine-formaldehyde resin of Example 6 with a urea-formaldehyde resin, we may substitute only part, e. g., from 10 to 90%, of the melamine resin with a urea resin.

Likewise, in other examples hereinbefore given the melamine-formaldehyde resin of the individual example may be replaced in whole or in part with a urea-formaldehyde resin or with other amidogen-aldehyde resins, numerous examples of which are herein given.

EXAMPLE 16

A partial reaction product of melamine and formaldehyde is prepared by heating together under reflux for 30 minutes 126 parts of melamine and 244 parts of aqueous formaldehyde (approx. 37% HCHO). To the resulting partial reaction product is now added 45 parts of a linear polymer obtained by reaction of ammonia and epsilon-caprolactam as described under Example 10, and the linear polymer is intercondensed into the melamine-formaldehyde partial reaction product by heating the mass under reflux for 1½ hours. The resulting intercondensation product is used in liquid compositions for laminating paper, canvas, and other fibrous sheet materials in the same general manner as hereinbefore described. This syrupy reaction product also may be used in the production of molding compositions of both the filled and unfilled types. The introduction of the linear polymer into the amidogen-aldehyde aminolast in this manner (or as described in the example which follows) has the advantage that cured molded and laminated articles having somewhat better color are obtained than when the polymer is merely brought into contact with the aminoplast by physical admixture during compounding of a molding composition or by dissolving the polymer and the aminoplast in a mutual solvent.

EXAMPLE 17

A co-reacted amidogen-formaldehyde resin modified with a polymeric reaction product of epsilon-caprolactam and ammonia was also prepared for incorporation into paper through the medium of a paper beater.

| | Parts |
|---|---|
| Melamine | 89 |
| Aqueous formaldehyde (approx. 37% HCHO) | 198 |
| Linear polymer [1] | 100 |

[1] This polymer was prepared by heating 800 parts of epsilon-caprolactam and 400 parts of anhydrous ammonia in an autoclave at 200° C. After discharging the excess ammonia, the reaction product was heated under reduced pressure to remove unreacted epsilon-caprolactam and other volatile matter. The temperature was taken to 200° C. at 6 mm. pressure. The yield of polymer residue, which was a hard, tough resin when cold, was 70% of the crude reaction product that was subjected to vacuum distillation.

The linear polymer and aqueous formaldehyde were first heated together under reflux for 20 minutes to effect reaction therebetween. After cooling, the melamine was added and heating was continued to cause co-reaction between the melamine and the linear polymer-formaldehyde reaction product. After heating for 35 minutes at 83°-98° C. and a pH of 7.7 to 7.1, a clear, somewhat hydrophobic syrup was obtained. Twenty-five (25) parts of the cooled syrup was dissolved in 78 parts of water and 6.7 parts of concentrated hydrochloric acid. The resulting solution (acid resin solution) was aged for more than one week.

Paper pulp was disintegrated and treated in an experimental paper beater. To the 1% suspension of paper fibers, the above acid resin solution was added to provide 6% of rosin solids based on the fiber, and the mixture of fiber stock and resin was agitated for about 30 minutes. Hand sheets were made from the resin-treated paper stock and tested. The dry and wet tensile strengths of these sheets were, respectively, 32.4 and 7.0 pounds per inch as compared with dry and wet tensile strengths of 24.4 and 0.6 pounds per inch for sheets similarly made but which contained no resin.

It will be understood, of course, by those skilled in the art that our invention is not limited to the specific compositions or to the particular procedures given in the above illustrative examples. Thus, instead of the specific linear polymers employed in the examples we may use, depending, for instance, upon the particular amidogen-formaldehyde reaction product which is being modified and the particular use intended for the modified product, any other linear polymer of the kind described in the first three paragraphs of this specification and more fully in the aforementioned Kropa and Padbury copending application Serial No. 21,854, or formaldehyde- or other aldehyde-reaction products of such linear polymers, or mixtures (in any proportions) of such polymers and aldehyde-reaction products thereof.

The preferred polymers are those having an average molecular weight not higher than, say, 1000 or 1200, more specifically those having an average molecular weight within the range of about 400 to about 600 or 650. The lower molecular-weight polymers are more readily dissolved in alcohol or in mixtures of alcohol and water with obvious advantages, especially in the preparation of liquid coating, impregnating, adhesive, laminating and similar compositions wherein a relatively inexpensive, inert, volatile solvent is desired. It may here be mentioned that the linear polymers used in practicing this invention that have average molecular weights of the order of 400 to 500 or 600 often yield cloudy solutions upon the addition of water. However, when such polymers are added to aqueous solutions of an amidogen-aldehyde resin, specifically an aqueous solution of a melamine-formaldehyde resin, solutions of improved clarity are surprisingly obtained.

Our invention is operative with reaction products of an aldehyde, specifically formaldehyde, and any monomeric amidogen compound containing at least two aldehyde-reactable amino or amido or amino and amido groupings, that is to say, any monomeric amidogen compound containing at least two amidogen groupings each having at least one hydrogen atom (preferably two hydrogen atoms) attached to the amidogen nitrogen atom.

As amidogen-aldehyde aminoplasts we prefer to use heat-curable or potentially heat-curable resinous reaction products of ingredients comprising a polyaminotriazine (e. g., melamine) and formaldehyde, or comprising urea, melamine (or other polyaminotriazine) and formaldehyde. However, heat-curable or potentially heat-curable urea-formaldehyde, thiourea-formaldehyde and thiourea - melamine - formaldehyde resinous reaction products also may be employed. Dimethylol urea, alkyl ethers thereof, polymethylol melamines (more particularly mono-, di-, tri-, tetra-, penta- and hexamethylol melamines) and alkyl ethers thereof may be used. Examples of other amidogen compounds which may be reacted with an aldehyde to provide the primary product which is modified in accordance with the present invention are: methylurea, phenylurea, phenylthiourea, allylurea, guanylurea, guanylthiourea, dicyandiamide, guanidine, biguanide, diaminodiazines, guanazole and other diaminotriazoles, ammeline, ethylenediamine, etc. Numerous examples of aldehydes that may be reacted with the amidogen compound have been mentioned hereinbefore. These amidogen-aldehyde aminoplasts are prepared, in general, in accordance with technique well known to the art. The molar ratio of aldehyde to amidogen compound, depending, for instance, upon the particular amidogen compound employed, may vary, for example, from 0.35 to 2.0 moles thereof for each aldehyde-reactable amidogen grouping in the amidogen compound. Similar proportions of formaldehyde or other aldehyde may be used in preparing the aldehyde-reaction product of the linear polymer.

Dyes, pigments and opacifiers may be incorporated into the compositions of this invention to alter the visual appearance and the optical properties of the finished product. If needed, mold lubricants may be added to facilitate molding of the heat-convertible (heat-hardenable) molding compositions. Fillers (e. g., alpha-cellulose, asbestos, mica, wood flour, etc.) may be incorporated to obtain a wide variety of molding compounds and molded articles adapted to meet particular conditions. Curing agents, examples of which have been given hereinbefore, also may be added. Other effect agents also may be incorporated as desired or as conditions may require.

Thermosetting (heat - hardenable) molding compositions comprising a heat-curable or potentially heat-curable amidogen-aldehyde aminoplast which has been modified, specifically plasticized or softened and/or toughened as herein described, may be molded into a variety of shapes under heat and pressure, more particularly at temperatures of the order of 100° to 200° C., preferably from approximately 120° or 130° to 170° or 180° C. The plasticized compositions show good plastic flow during molding. Molded articles of manufacture comprising the molded, heat-hardened molding compositions produced in accordance with our invention have a good surface finish, show no evidence of "bleeding" plasticizer and have other improved properties such as have been mentioned or indicated (for instance, in many of the examples) hereinbefore.

The modified amidogen-aldehyde aminoplasts of our invention are especially suitable for use in producing post-formable laminated articles comprising superimposed sheets of fibrous material such as paper, glass cloth, or cloth formed of silk, wool, cotton, rayons, etc., or cloths produced from synthetic fibers, e. g., fibers of nylon, polyacrylonitrile (or copolymers of acrylonitrile), vinyl chloride - acrylonitrile copolymers, vinyl chloride-vinylidene chloride copolymers, etc. In such structures the sheets are impregnated and bonded together with a thermoset product of reaction of ingredients comprising an aldehyde, specifically formaldehyde, and a monomeric amidogen compound of the kind aforementioned, which reaction product is modified (plasticized or softened and/or toughened) with a modifier of the kind previously described. In such cases, the linear polymeric material employed has an average molecular weight of not more than 2000 and constitutes at least 5%, preferably at least 20%, but not more than 50 or 60% by weight of the total amount of aminoplast and modifier. The scope of the invention also includes articles of manufacture comprising the post-formable laminated article which has been post-formed to a desired shape. Our invention also includes within its scope the method which comprises impregnating fibrous sheet material with liquid compositions of the kind herein described, drying the impregnated material, superimposing the dried sheets, bonding the superimposed sheets together under heat and pressure (e. g., under such conditions of heat and pressure as aforementioned with reference to the production of a molded article) thereby to obtain a laminated sheet article, and deforming the laminated article while hot to a desired shape.

Our modified amidogen-aldehyde aminoplasts are also useful as adhesives, as components of surface-protective compositions, as additives to paper pulp in making a wet-strength paper and for numerous other purposes. The modified  amidogen-aldehyde aminoplasts of our invention, both filled and unfilled, have a wide variety of applications other than those hereinbefore described. In the filled compositions the amount of filler (examples of which previously have been given) may be widely varied depending, for example, upon the particular filler employed and the intended use of the filled composition or product. Thus, the amount of filler may constitute, for instance, from a few per cent (e. g., from 2 to 5 or 10%) up to 50 or 60%, or even as much as 70 or 80% in some cases, by weight of the combined weight of filler and modified amidogen-aldehyde aminoplast.

We claim:

1. A composition of matter comprising a product of reaction of ingredients comprising (a) an aldehyde and (b) a monomeric amidogen compound containing not less than two amidogen groupings each having at least one hydrogen atom attached to the amidogen nitrogen atom, said reaction product being modified with a preformed nitrogenous compound which is different from the compound of (b) and which is a member of the class consisting of (1) linear polymeric reaction products of (A) epsilon-caprolactam and (B) a compound represented by the general formula $$N{<}{\overset{H}{\underset{R}{}}}$$

where R represents a member of the class consisting of hydrogen, alkyl radicals and monohydroxyalkyl radicals, the ingredients of (A) and (B) being the sole reactants used in forming the said linear polymeric reaction products and being employed in the ratio of 1 mole of the former to not less than 1 mole of the latter, (2) aldehyde-reaction products of (1), and (3) mixtures of (1) and (2), said linear polymeric reaction products having an average molecular weight of not more 2000 and an intrinsic viscosity not higher than 0.35.

2. A composition of matter comprising a product of reaction of ingredients comprising (a) formaldehyde and (b) a monomeric amidogen compound containing not less than two amidogen groupings each having at least one hydrogen atom attached to the amidogen nitrogen atom, said reaction product being modified with a preformed linear polymeric material which is the reaction product of (A) epsilon-caprolactam and (B) a compound represented by the general formula

where R represents a member of the class consisting of hydrogen, alkyl radicals and monohydroxyalkyl radicals, the ingredients of (A) and (B) being the sole reactants used in forming the said linear polymeric material and being employed in the ratio of 1 mole of the former to from 1 to 20 moles of the latter, said linear polymeric material having an average molecular weight of not more than 2000 and an intrinsic viscosity not higher than 0.35.

3. A composition as in claim 2 wherein the amidogen compound of (b) is urea.

4. A composition as in claim 2 wherein the amidogen compound of (b) is melamine.

5. A composition as in claim 2 wherein the compound of (B) is ammonia.

6. A composition as in claim 2 wherein the compound of (B) is a monoalkanolamine.

7. A composition as in claim 6 wherein the monoalkanolamine is monoethanolamine.

8. A heat-curable composition comprising a heat-convertible product of reaction of ingredients comprising (a) formaldehyde and (b) a monomeric amidogen compound containing not less than two amidogen groupings each having two hydrogen atoms attached to the amidogen nitrogen atom, said reaction product being modified with a preformed linear polymeric material which is the reaction product of (A) epsilon-caprolactam and (B) a compound represented by the general formula

where R represents a member of the class consisting of hydrogen, alkyl radicals and monohydroxyalkyl radicals, the ingredients of (A) and (B) being the sole reactants used in forming the said polymeric material and being employed in the ratio of 1 mole of the former to from 1 to 20 moles of the latter, and the said linear polymeric material having an average molecular weight of not more than 1200 and an intrinsic viscosity not higher than 0.25.

9. A product comprising the cured composition of claim 8.

10. A composition as in claim 8 wherein the amidogen compound of (b) is melamine.

11. A composition comprising (1) a thermosetting melamine-formaldehyde reaction product plasticized with (2) a plasticizer comprising a preformed linear polymeric material which is the reaction product of (A) epsilon-caprolactam and (B) a compound represented by the general formula

where R represents a member of the class consisting of hydrogen, alkyl radicals and monohydroxyalkyl radicals, the ingredients of (A) and (B) being the sole reactants used in forming the said linear polymeric material and being employed in the ratio of 1 mole of the former to not less than 1 mole of the latter, the said linear polymeric material being compatible with the melamine-formaldehyde reaction product of (1) and having an average molecular weight within the range of 400 to 1200 and an intrinsic viscosity not higher than 0.25, and the said plasticizer of (2) constituting from 5 to 50% by weight of the total of (1) and (2).

12. A reaction product of ingredients comprising (1) an aldehyde and (2) a preformed linear polymeric material which is the reaction product of (A) epsilon-caprolactam and (B) a compound represented by the general formula

where R represents a member of the class consisting of hydrogen, alkyl radicals and monohydroxyalkyl radicals, the ingredients of (1) and (2) being the sole reactants used in forming the said linear polymeric material and being employed in the ratio of 1 mole of the former to not less than 1 mole of the latter, and said linear polymeric material of (2) having an average molecular weight of not more than 2000 and an intrinsic viscosity not higher than 0.35.

13. A reaction product as in claim 12 wherein the aldehyde of (1) is formaldehyde.

14. A heat-hardenable molding composition comprising (1) a filler, (2) a heat-curable product of reaction of ingredients comprising (a) formaldehyde and (b) a monomeric amidogen compound containing not less than two amidogen groupings each having two hydrogen atoms attached to the amidogen nitrogen atom, and (3) a plasticizer which is compatible with the reaction product of (2) and which comprises a preformed linear polymeric reaction product of (A) epsilon-caprolactam and (B) a compound represented by the general formula

where R represents a member of the class consisting of hydrogen, alkyl radicals and monohydroxyalkyl radicals, the ingredients of (A) and (B) being the sole reactants used in forming the said linear polymeric reaction product and being employed in the ratio of 1 mole of the former to not less than 1 mole of the latter, said linear polymeric reaction product having an average molecular weight of not more than 1200 and an intrinsic viscosity not higher than 0.25, and said plasticizer of (3) constituting from 5 to 50% by weight of the total of (2) and (3).

15. An article of manufacture comprising the heat-hardened molding composition of claim 14.

16. A liquid composition comprising a solution containing (1) a soluble, thermosetting product of reaction of ingredients comprising (a) formaldehyde and (b) a monomeric amidogen compound containing not less than two amidogen groupings each having two hydrogen atoms attached to the amidogen nitrogen atom and (2) a preformed, soluble, linear polymeric material which is a reaction product of (A) epsilon-caprolactam and (B) a compound represented by the general formula

where R represents a member of the class consisting of hydrogen, alkyl radicals and monohydroxyalkyl radicals, the ingredients of (A) and (B) being the sole reactants used in forming the said linear polymeric material and being employed in the ratio of 1 mole of the former to from 1 to 20 moles of the latter, the linear polymeric material of (2) being compatible with the cured reaction product of (1) and being effective as a plasticizer therefor, having an average molecular weight of not more than 2000 and an intrinsic viscosity not higher than 0.35, and being present in the said solution in an amount corresponding to from 5 to 50% by weight of the total of (1) and (2), the percentages being calculated on a dry basis.

17. A post-formable laminated article comprising superimposed sheets of fibrous material impregnated and bonded together with (1) a thermoset product of reaction of ingredients comprising (a) formaldehyde and (b) a monomeric amidogen compound containing not less than two amidogen groupings each having two hydrogen atoms attached to the amidogen nitrogen atom, said product of (1) being plasticized with (2) a preformed linear polymeric material which is a reaction product of (A) epsilon-caprolactam and (B) a compound represented by the general formula

where R represents a member of the class consisting of hydrogen, alkyl radicals and monohydroxyalkyl radicals, the ingredients of (A) and (B) being the sole reactants used in forming the said linear polymeric material and being employed in the ratio of 1 mole of the former to from 1 to 20 moles of the latter, the linear polymeric material of (2) having an average molecular weight of not more than 2000, an intrinsic viscosity not higher than 0.35 and constituting from 5 to 50% by weight of the total of (1) and (2).

18. An article of manufacture comprising the laminated article of claim 17 post-formed to a desired shape.

19. The method of modifying a product of reaction of ingredients comprising (A) an aldehyde and (B) a monomeric amidogen compound containing not less than two amidogen groupings each having at least one hydrogen atom attached to the amidogen nitrogen atom, said method comprising effecting reaction at a temperature ranging from room temperature to the reflux temperature of the reaction mass between the reactive components of the said reaction product and a preformed nitrogenous compound which is different from the compound of (B) and which is a member of the class consisting of (1) linear polymeric reaction products of (a) epsilon-caprolactam and (b) a compound represented by the general formula

where R represents a member of the class consisting of hydrogen, alkyl radicals and monohydroxyalkyl radicals, the ingredients of (a) and (b) being the sole reactants used in forming the said polymeric reaction products and being employed in the ratio of 1 mole of the former to not less than 1 mole of the latter, (2) aldehyde-reaction products of (1), and mixtures of (1) and (2), said linear polymeric reaction products having an average molecular weight of not more than 2000 and an intrinsic viscosity not higher than 0.35.

20. The method which comprises impregnating fibrous sheet material with the liquid composition of claim 16, drying the impregnated material, superimposing the dried sheets, bonding the superimposed sheets together under heat and pressure to obtain a laminated sheet article, and deforming the said laminated article while hot to a desired shape.

HENRY P. WOHNSIEDLER.
EDWARD L. KROPA.
WALTER M. THOMAS.

REFERENCES CITED

The following references are of record in the file of this patent:

UNITED STATES PATENTS

| Number | Name | Date |
|---|---|---|
| 2,071,253 | Carothers | Feb. 16, 1937 |
| 2,174,527 | Peterson | Oct. 3, 1939 |
| 2,244,184 | Austin et al. | June 3, 1941 |
| 2,264,293 | Brubaker | Dec. 2, 1941 |
| 2,377,868 | D'Alelio | June 12, 1945 |
| 2,413,697 | Edgar | Jan. 7, 1947 |
| 2,432,752 | Gray | Dec. 16, 1947 |
| 2,443,486 | Watkins | June 15, 1948 |
| 2,466,854 | Koch | Apr. 12, 1949 |
| 2,482,252 | Edgar | Sept. 20, 1949 |

Certificate of Correction

Patent No. 2,584,177 — February 5, 1952

HENRY P. WOHNSIEDLER ET AL.

It is hereby certified that error appears in the printed specification of the above numbered patent requiring correction as follows:

Column 2, line 22, for "(about 16.)" read (*about 16*).; column 3, line 66, for "thereto" read *therefore*; column 5, line 6, for "amidogenalde-" read *amidogen-alde-*; column 11, line 43, for "Malamine" read *Melamine*; column 12, line 56, for "forementioned" read *aforementioned*; column 15, line 25, for "acohol" read *alcohol*; line 30, for "varried" read *varied*; line 36, for "amidogenaldehyde" read *amidogen-aldehyde*; column 17, line 44, for "aminolast" read *aminoplast*; column 18, line 14, for "rosin" read *resin*; line 31, for "formaldehyde" read *aldehyde*;

and that the said Letters Patent should be read as corrected above, so that the same may conform to the record of the case in the Patent Office.

Signed and sealed this 2nd day of September, A. D. 1952.

[SEAL]

THOMAS F. MURPHY,
*Assistant Commissioner of Patents.*